United States Patent [19]

Weideman

[11] 4,170,223
[45] Oct. 9, 1979

[54] SOLAR HEAT ENERGY COLLECTOR

[76] Inventor: Andries C. Weideman, 14 Leipoldt St., Parow North, South Africa

[21] Appl. No.: 808,677

[22] Filed: Jun. 21, 1977

[51] Int. Cl.$^2$ ................................................ F24J 3/02
[52] U.S. Cl. .................................................. 126/450
[58] Field of Search ................ 126/270, 271; 237/1 A

[56] References Cited
U.S. PATENT DOCUMENTS

| | | | |
|---|---|---|---|
| 3,897,820 | 8/1975 | Teeter, Jr. | 126/271 |
| 3,949,732 | 4/1976 | Reines | 126/271 |
| 3,995,804 | 12/1976 | Folds et al. | 126/271 |
| 4,080,957 | 3/1978 | Bennett | 126/271 |

Primary Examiner—Kenneth W. Sprague
Attorney, Agent, or Firm—Holman & Stern

[57] ABSTRACT

The invention provides a solar heat energy collector, more particularly of the kind used for heating water which comprises two members, for instance, metal sheets, between which is sandwiched sealing means located towards the periphery of the members to provide a receptacle. The two members are held in sealing contact with the sealing means by means of clamping means which is forced over peripheral portions of the two members. Provision is made for restricting movement of the sealing means between the plates and against dislodgement of the clamping means.

16 Claims, 11 Drawing Figures

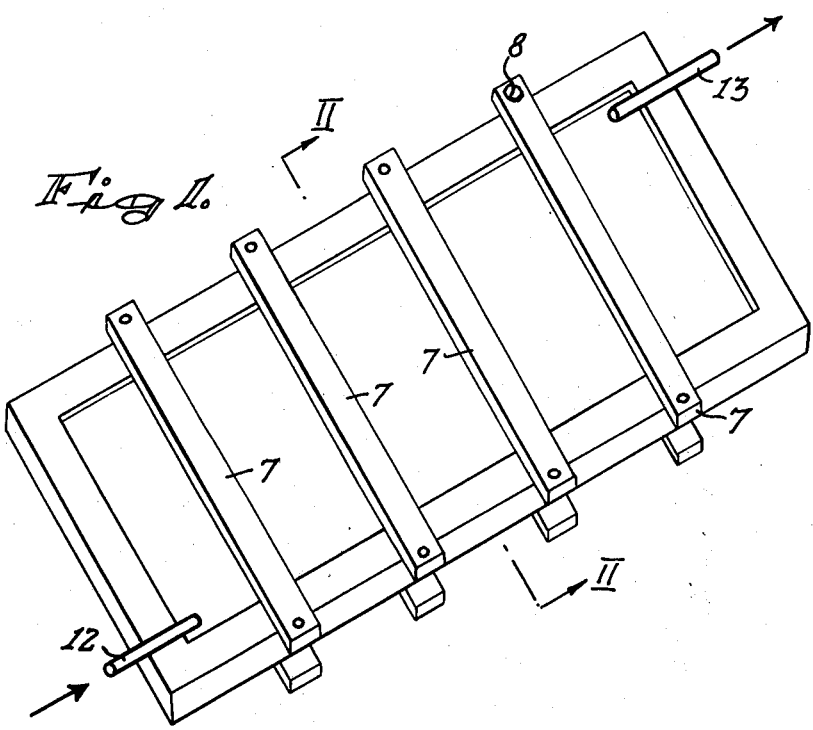
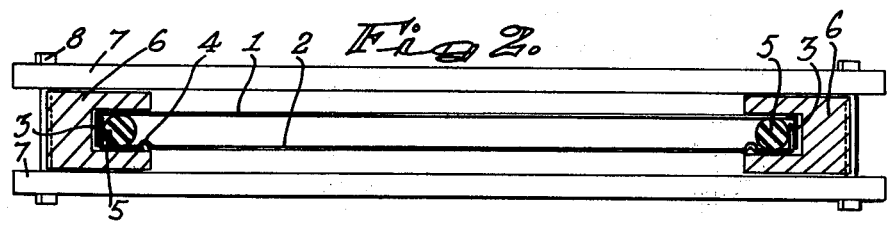
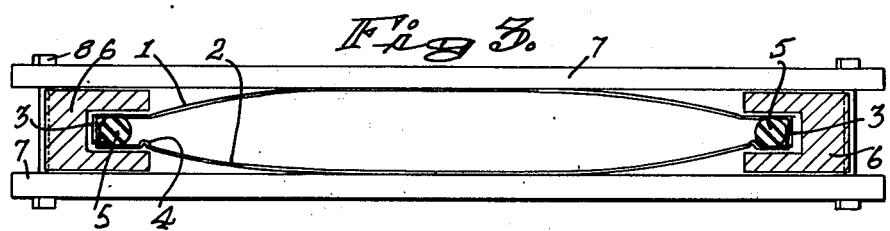

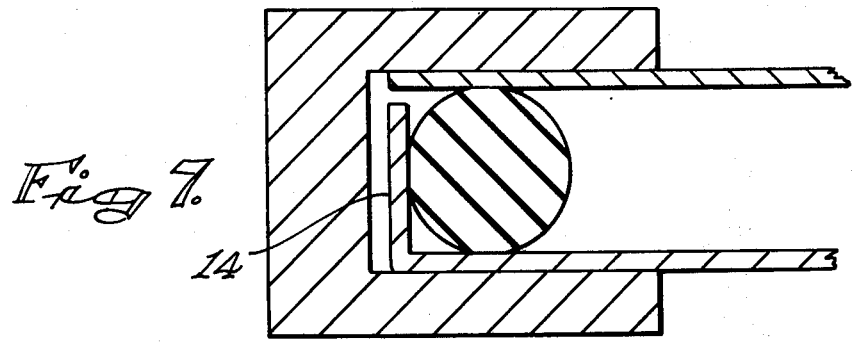
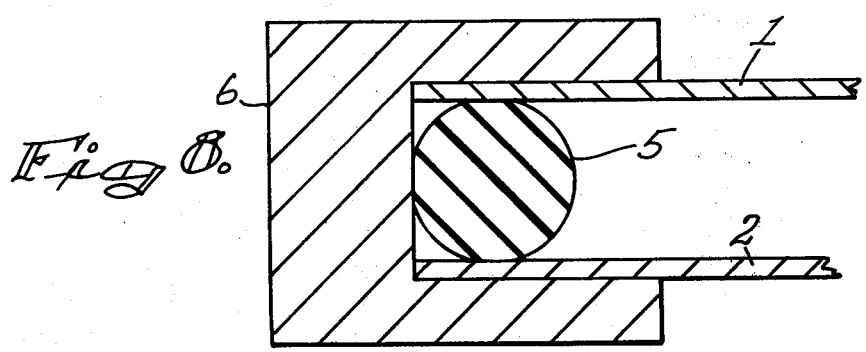
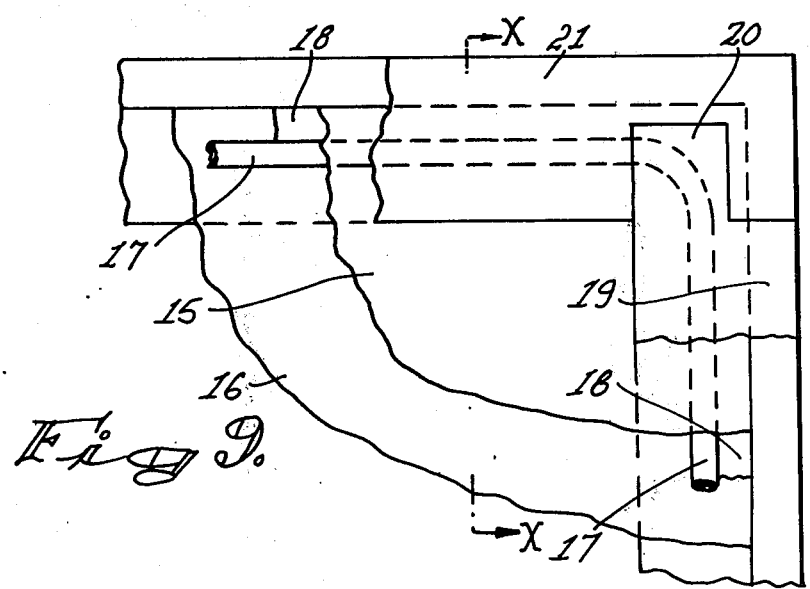

SOLAR HEAT ENERGY COLLECTOR

FIELD OF THE INVENTION

This invention relates to solar heat collectors, more particularly of the kind commonly referred to as solar water heaters.

BACKGROUND OF THE INVENTION

Solar water heaters are well known and are presently marketed in a large variety of different forms. In one arrangement, the solar water heater comprises backing means and collector means which are assembled to constitute a container in which the water to be heated is presented to the rays of the sun and heated surfaces of the collector means.

The collector means includes a panel manufactured from a good heat conducting material such as stainless steel, galvanized iron or copper sheeting and is set up, in an operative position of the heater, to face the sun for maximum absorption of the heat energy and transmission of radiated energy from the sun. In some solar water heaters, the backing means is manufactured from the same material as the collector means and then seam welded to the collector means to provide the container.

It has been found that there is a tendency for the dissolved solids in the water to deposit out on the collector means which leads to a substantial reduction in the efficiency of the solar water heater. In areas where the dissolved solids content of the water is high, the solar water heater may have to be cleaned out, i.e., descaled, regularly at short intervals of time. In the case where the collector means and the backing means are welded together, the descaling operation necessitates the use of a suitable reactant, for instance, an acid solution. Not only in this not satisfactory in that the descaling is never complete over the entire inner area of the collector means, but pitting away of the container's metal surface occurs with obvious disadvantages. Furthermore, inspection of the container's interior is not possible to establish the degree of descaling achieved. Also, the container must be dismantled in order to effect descaling. Seen as a whole, therefore, such welded forms of containers are not satisfactory, particularly when regular descaling is necessary in areas where the water used has a high dissolved solids content.

In order to overcome these problems inherent in solar water heaters having a welded container as described above, it is known to provide a container in which the backing means and the collector means are bolted together, a suitable gasket being sandwiched between the collector means and backing means to establish the required liquid seal between these members. Loosening the bolts permits the backing means and the collector means to be separated for purposes of mechanically descaling and inspecting the interior of the container.

Generally, where the collector means is manufactured from a thin metal sheet as is usually the case, a large number of bolts must be used in order to maintain a good seal between the collector means and the backing means. It has been found that, not only is difficulty sometimes esperienced in unscrewing the bolts, for instance, due to rust or damage, but difficulty is also sometimes experienced in locating the bolts back in position during re-assembly of the container. Because of this and the large number of bolts involved, the operation of dismantling and re-assembling such container can, therefore, be time consuming.

An object of the present invention is the provision of a solar heat collector in which this difficulty is overcome to a large extent.

SUMMARY OF THE INVENTION

According to the invention, a solar heat collector includes:
- first and second members adapted to be assembled into an enclosed hollow receptacle;
- sealing means adapted for location between adjacent portions of the first and second members;
- outer locating means extending along at least part of the periphery of at least one of the members, the outer locating means being adapted to restrict outward displacement of the sealing means from between the first and second members; and
- clamping means adapted to engage releasably over the peripheral portions of the first and second members to urge such portions into sealing contact with the sealing means.

The members may be flat, dish-or box-shaped. In the case of a box-shaped member, outwardly extending flange formations may be provided around the open end of the box formation for overlapping with the other member.

The sealing means is preferably selected to expand into firmer sealing relationship with the first and second member on fluid pressure being applied to it from inside the enclosed hollow receptacle. Thus, the sealing means may comprise a lip or O-ring type gasket. Such sealing means may be solid or hollow.

In one form of the invention, the outer locating means comprises a flange. Preferably, flanges are provided on both first and second members, in which case they overlap in the assembled condition of the solar heat collector.

In a second form of the invention, the outer locating means is provided by the clamping means.

In a third form of the invention, the outer locating means comprises inserts adapted to be held in position, between the first and second means, by the clamping means.

Further according to the invention, inner locating means is provided on at least one of the members, the inner locating means being adapted to limit inward displacement of the sealing means.

In one form of the invention, the inner locating means comprises a raised portion formed on at least one of the members, the raised portion extending into the cavity between the members in the assembled condition of the solar heat collector.

In another form of the invention, the inner and outer retaining means comprise a slot formed in at least one of the members and in which the sealing means is seated.

The clamping means may comprise channel sections or clips which are forced over the edge portions of the first and second members.

Also according to the invention, retaining means is provided for retaining the clamping means in position. In one form of the invention, the retaining means comprises pairs of longitudinally extending members, one member of each pair of members being located against a side of the clamping means and the members of a pair being drawn tight together by means of a nut and bolt arrangement. In another form of the invention, the retaining means comprises a lip or rib formation provided on the clamping means, the lip or rib formation being adapted to engage in the locating means on at least one of the members. In a third form of the invention, the retaining means comprises interlocking formations on the longitudinally extending members.

The invention is also directed towards a substantially flat sheet member adapted for use in the assembly of a solar heat collector including a flange extending along at least portion of the periphery of such sheet member and standing proud of such sheet member and a slot or raised portion located inwardly of such flange.

The invention is also directed towards a method of assembling a solar heat collector comprising use of the component parts set out above.

DESCRIPTION OF THE DRAWINGS

FIG. 1 is a three-dimensional view of one form of the solar heat collector according to the invention;

FIG. 2 is a section on the line II—II of FIG. 1;

FIG. 3 is the section of FIG. 2 with upper and lower panel members forming part of the solar heat collector shown in a distended condition;

FIG. 7 is an enlarged section of an edge portion of a fourth form of solar heat collector according to the invention;

FIG. 8 is an enlarged section of an edge portion of a fifth form of solar water heater according to the invention;

FIG. 9 is a plan of a corner portion, with parts removed of a sixth form of solar water heater according to the invention;

Referring to FIGS. 1 to 4 of the drawings, there is shown a solar water heater according to one form of the invention which comprises first and second members in the form of upper and lower panels 1, 2 formed from galvanized iron sheeting, stainless steel sheeting, copper sheeting or other suitable sheeting. The upper and lower panels are substantially rectangular in plan.

Figure 4:
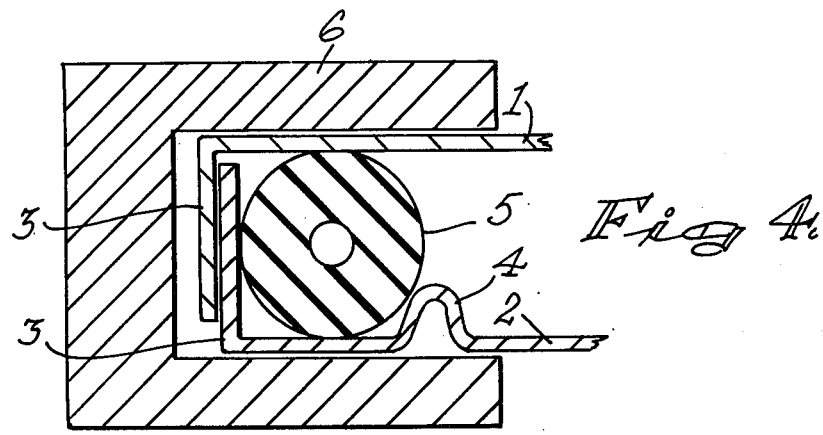
FIG. 4 is an enlarged section of an edge portion, with parts removed, of a solar heat collector according to one form of the invention.

As will be seen from FIGS. 2, 3 and 4 the edge portions of the panels are bent up to define outer locating means in the form of flanges 3, standing proud of the rest of the sheet. In the assembled condition of the solar water heater, these flanges overlap.

Spaced inwardly from the flanges there is provided inner locating means in the form of a raised portion 4 which is rolled or otherwise developed in the sheet.

Both the flanges 3 and such raised portion 4 together provide locating means which restricts displacement of the sealing means outwardly from between the panels as well as inwardly between the panels.

The sealing means as shown in FIGS. 2, 3 and 4 comprises an O-ring 5 which may either be solid as shown in FIGS. 2 and 3 or hollow as shown in FIG. 4 and may be manufactured from a suitable material, for instance, neoprene rubber. This O-ring is cut from a suitable length of a bulk supply thereof and then joined at its ends to provide a continuous gasket which extends along the edges of the upper and lower panels 1, 2.

In order to retain the upper and lower panels in sealing contact with the O-ring, there is provided a clamping means in the form of an extruded channel section 6 which is cut to suitable lengths to frame the upper and lower panels. The inner dimensions of such channel members are such that when forced over the edge portions of the upper and lower panels, they urge such upper and lower panels into sealing contact with the O-ring.

Lastly, there is provided retaining means in the form of pairs of metal straps or bars 7. The metal bars are arranged in pairs against the sides of the channel sections and then drawn together by means of nuts and bolts 8 to clamp the channel sections between them.

Although not shown in the drawings, recesses may be provided in the channel sections 6 to locate the bolts 8. Recesses may also be provided in the channel sections 6 which recesses receive the bars 7 to prevent displacement of the bars.

The retaining means serve a dual purpose. In the first place, they limit outward distension of the upper and lower panels under pressure that may be present in the solar water heater. Secondly, they serve the purpose of preventing the two longer channel sections from slipping off the edge portions of the upper and lower panels.

This form of the invention is assembled by locating the O-ring gasket in position between the raised portions 4 and the flanges 3 on the lower panel. Although not shown in the drawings, such O-ring can be suitably bonded in position by applying to it and the lower panel, a suitable bonding agent. The upper panel is then located in position over the lower panel so that the two panels together define a hollow enclosed receptacle. The two shorter channel sections are then forced over the edge portions of the panels to urge the panels into sealing contact with the O-ring gasket. The longer channel sections are then slipped onto the remaining edge portions of the upper and lower panels. Lastly, the bars 7 are located in position and bolted together to retain the longer channel sections in position. The solar water heater may then be suitably mounted and connected up in a conventional manner to a hot water installation. For this purpose an inlet 12 and an outlet 13 are provided, as shown in FIG. 1, in the upper panel 1. The reason for locating the outlet in an upper corner of an upper panel is to allow as much air as possible to escape from the receptacle when flooding it. Air, it will be appreciated, is a poor conductor of heat and any air trapped in the receptacle leads, therefore, to a reduction in the efficiency of the solar water heater.

Other forms of the invention are shown in FIGS. 5 to 11.

Figure 5:
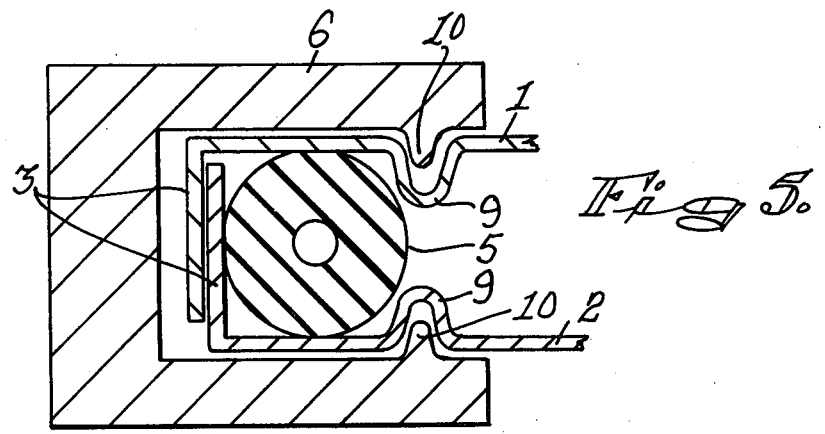
FIG. 5 is an enlarged section of an edge portion, with parts removed, of a second form of solar heat collector according to the invention.

In FIG. 5 both the upper and lower panels are provided with raised portions 9. In this case, the channel sections are provided with the retaining means in the form of rib formations 10 on the inner walls of such section. As will be seen, these rib formations engage in the recesses formed on the reverse side of the raised portions to lock the channel sections in position against slipping off the edge portions of the upper and lower panels.

Figure 6:
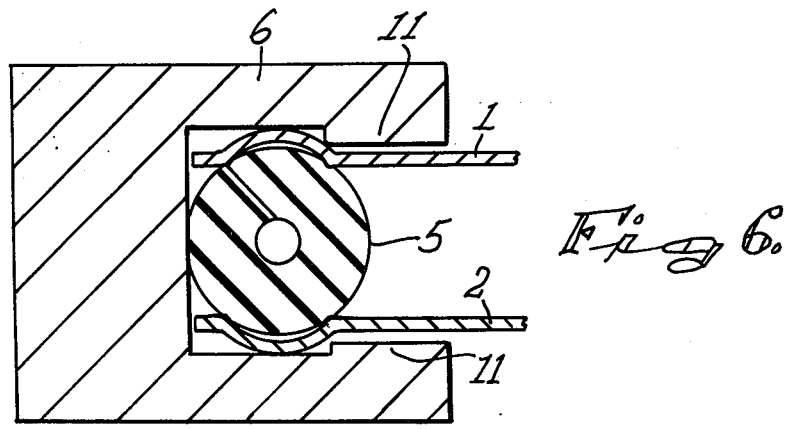
FIG. 6 is an enlarged section of an edge portion of a third form of solar heat collector according to the invention.

In FIG. 6 of the drawings, the O-ring is located in suitable slots formed in the edge portions of the upper and lower panels. In this case, the retaining means comprises raised portions 11 on the inner faces of the channel section, the raised portions locking behind the outer wall of the slot formations to prevent the clamping means from slipping off the edge portions of the upper and lower panels.

In the form of the invention shown in FIGS. 5 and 6, the bars 7 of the form of the invention shown in FIGS. 1 to 4 may be dispensed with. Furthermore, the flanges 3 shown in FIGS. 2 to 5 may be dispensed with in the case of the form of the invention shown in FIG. 6. In this form of the invention, the walls of the slot and the inner bottom face of the clamping means define the inner and outer locating means.

Instead of overlapping flanges 3 as shown in FIGS. 2, 3, 4 and 5, only a single flange 14 as shown in FIG. 7 may be provided.

In certain areas the water pressure may be such as to dispense with the need for forming flanges 3 and raised portion 4 of the FIGS. 2 to 5. Provided that the width of the channel of the clamping means 6 is sufficiently narrow to cause the clamping means 6 to locate over the panels 1 and 2 in a sufficiently tight force fit, the O-ring 5 will not displace. In this case, the back inner face of the clamping means 6 provides the outer retaining means. As a pressure build-up occurs inside the receptacle, the O-ring 5 distorts into firmer contact with the panels 1 and 2 and the clamping means 6.

It has been found that it is very difficult to mitre an O-ring or the like gasket accurately so that a proper joint is obtained at the corners of the panel. In order to overcome this difficulty, the O-ring is provided as a single length which is joined at its free ends to provide a loop. The O-ring is then laid on one of the panels so that at the corners of the panels a neat curve is formed. It has been found that, with a build-up of pressure inside the solar water heater, there is a tendency for the O-ring in the curve portion to be displaced outwardly towards the corners of the panels. As a result stretch takes place, leading to a restriction in the diameter of the O-ring and possible loss of sealing contact with the inner faces of the panels.

Figure 10:
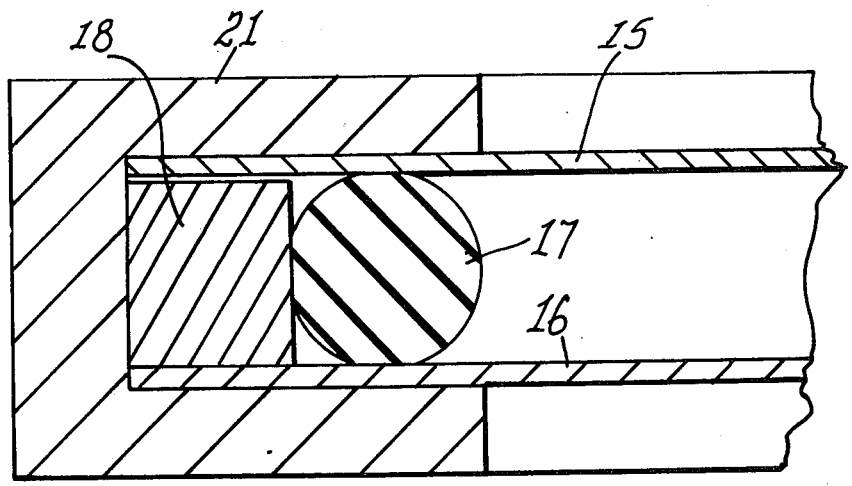
FIG. 10 is a section on the line X—X of FIG. 9.
Figure 11:
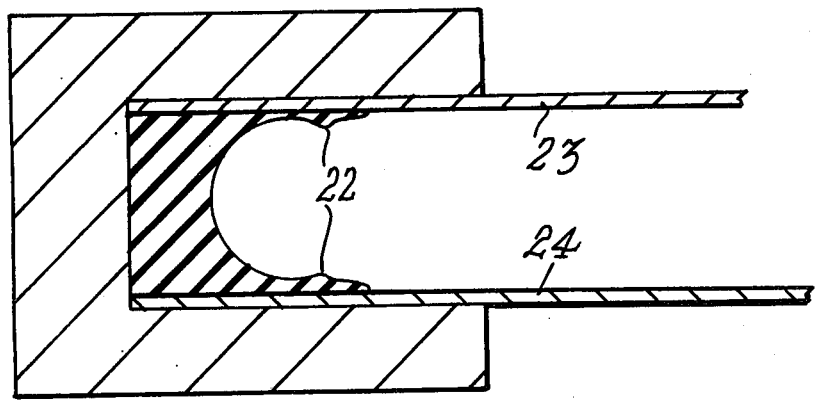
FIG. 11 is an enlarged section of an edge portion of a seventh form of solar water heater according to the invention.

In order to overcome this problem, the present invention provides outer locating means in the form of loose inserts. This form of the invention is shown in FIGS. 9 and 10. The solar water heater comprises upper and lower panels 15, 16 between which is sandwiched an O-ring gasket 17. Behind the O-ring, on the outside of the O-ring there is located locating means in the form of a loose insert 18. As will be seen from FIG. 9, the insert follows, in the corners, the contour of the O-ring to prevent displacement thereof as described above.

Although the invention has been described in relation to substantially flat panels, circumstances may require that the solar water heater serve as a tank for hot water in which case the lower panel may be dish- or box-shaped.

Because the retaining means in the form of bars 7 (see FIGS. 1 to 3) only acts on the longer of the clamping means 6, provision may be made for the longer clamping means to lock the shorter clamping means in position. This arrangement of the invention is shown in FIG. 9 of the accompanying drawings in which the shorter channel section 19 is provided with a projection 20 that locks, in the assembled form of the solar water heater, into a recess formed in the longer channel section 21 which in turn is prevented from displacement by the bars 7 of FIGS. 1 to 3.

Sealing means other than O-rings may be used. In the arrangement of the invention shown in FIG. 11, the sealing means comprises a lip seal having lip formations 22 that are forced tighter into sealing relationship with the panels 23, 24 as a pressure build-up in the solar water heater occurs.

While specific aspects of the invention have been dealt with in the different drawings, it will be appreciated that such aspects could be combined in different form of the invention. Thus, the loose inserts of FIGS. 9 and 10 could equally well be used in all the other arrangements of the invention described above. The invention is, therefore, not limited to the particular arrangements described above but to any combination of any of the described features of the particular arrangements.

It will be apparent from the above description of various forms of the invention that the different component parts used in assembling the heater are readily manufactured and easily assembled. In fact, assembly can be carried out by unskilled labour.

In order to inspect the interior of the solar water heater and to descale the panels, the bolts holding the retaining means in position are released and the clamping members are then slipped off. At this stage, the upper panel can merely be lifted off the lower panel for servicing and inspection.

Other advantages of the invention may be mentioned. Because of the ability of the panels to distend under pressure, the solar water heater can serve as an additional storage tank for hot water in the installation. By means of suitable design, the solar water heater can itself form the hot water tank for a hot water installation. This ability of the panels to distend has the further advantage that no bursting of the heater will occur due to the water freezing during cold weather or as a result of water hammer in the system.

In certain solar water heaters, use is made of pipes or passages through which the water is passed during the heating cycle. Obviously, because of convection considerations, these solar water heaters can only be mounted with the pipes located in an inclined position. This may be a severe disadvantage in certain confined areas. The same disadvantage, however, does not apply to the present invention which allows the solar water heater to be mounted with its longer side resting on the slope of a roof or across the roof.

The invention, therefore, displays useful advantages over known solar heat collectors.

Although the invention has been described with reference to solar water heaters, it will be appreciated that it could be used for heating other fluid systems. Thus, it is conceivable that the invention could be used for heating the interior of a building in which case an oil system or air system may have certain advantages over a water system. The words "solar heat collector" have been chosen to extend the scope of the invention to include these other systems.

What is claimed is:

1. A solar heat collector including:
   first and second members for assembly into an enclosed hollow receptacle adapted to contain a body of liquid to be heated, each of said members forming at least part of an inner wall of the receptacle, and at least one of said members comprising a solar heat receptive panel adapted to receive radiant solar heat and give off such heat by conduction to the body of liquid;

sealing means for location between adjacent portions of the first and second members;

outer locating means extending along at least part of the periphery of at least one of the members for restricting outward displacement of the sealing means from between the first and second members; and clamping means for engaging releasably over peripheral portions of the first and second members to urge such portions into sealing contact with the sealing means the first and second members being separable from one another when the clamping means are released, thereby to permit exposure of at least part of the inner wall of the receptacle.

2. A solar heat collector as claimed in claim 1 in which the sealing means is of the type arranged to expand into tighter sealing relationship with the first and second members on fluid pressure applied from within the assembled solar heat collector increasing.

3. A solar heat collector as claimed in claim 2 in which the sealing means comprises an O-ring.

4. A solar heat collector as claimed in claim 2 in which the sealing means comprises a lip gasket.

5. A solar heat collector including:

first and second members for assembly into an enclosed hollow receptacle adapted to contain a body of liquid to be heated, each of said members forming at least part of an inner wall of the receptacle, and at least one of said members comprising a solar heat receptive panel adapted to receive radiant solar heat and give off such heat by conduction to the body of liquid;

sealing means for location between adjacent portions of the first and second members, the sealing means being of the type arranged to expand into tighter sealing relationship with the first and second members on fluid pressure being applied from within the assembled heat collector increasing;

outer locating means in the form of a flange extending along at least part of the periphery of at least one of the members for restricting outward displacement of the sealing means from between the first and second member; and clamping means for engaging releasably over peripheral portions of the first and second members to urge such portions into sealing contact with the sealing means the first and second members being separable from one another when the clamping means are released, thereby to permit exposure of at least part of the inner wall of the receptacle.

6. A solar heat collector as claimed in claim 5 in which flanges are provided on both first and second members to overlap in the assembled condition of the solar heat collector.

7. A solar heat collector as claimed in claim 1 in which inner locating means is provided on at least one of the members, the inner locating means being adapted to limit inward displacement of the sealing means.

8. A solar heat collector as claimed in claim 7 in which the inner locating means comprises a raised portion formed on at least one of the members, the raised portion extending into the cavity between the members in the assembled condition of the solar heat collector.

9. A solar heat collector as claimed in claim 7 in which the inner and outer locating means comprises a slot formed in at least one of the members and in which the sealing means is seated.

10. A solar heat collector as claimed in claim 1 in which the clamping means comprises channel sections for forcing over the edge portions of the first and second members.

11. A solar heat collector as claimed in claim 10 in which retaining means are provided comprising a lip or rib formation provided on the inside of the channel sections, the lip or rib formations being adapted to engage in corresponding locating formations on at least one of the members.

12. A solar heat collector as claimed in claim 1 in which retaining means is provided for retaining the clamping means in position.

13. A solar heat collector as claimed in claim 12 in which the retaining means comprises pairs of longitudinally extending members, one member of each pair of members being located against the side of the clamping means and the members of a pair being drawn tightly by means of a bolt and nut arrangement.

14. A solar heat collector as claimed in claim 13 in which the retaining means comprises interlocking formations provided on the clamping means.

15. A solar heat collector as claimed in claim 1 in which the locating means defines a continuous straight or smoothly curving inwardly facing abutment surface against which the sealing means is adapted to abut.

16. A solar heat collector as claimed in claim 15 in which said abutment surface is defined by a loose insert which is removable when the first and second members are separated from one another.

* * * * *